United States Patent
Sanders et al.

(10) Patent No.: US 8,659,760 B2
(45) Date of Patent: Feb. 25, 2014

(54) RESONATOR FIBER OPTIC GYROSCOPE UTILIZING LASER FREQUENCY COMBS

(75) Inventors: Glen A. Sanders, Scottsdale, AZ (US); Lee K. Strandjord, Tonka Bay, MN (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 128 days.

(21) Appl. No.: 13/445,319

(22) Filed: Apr. 12, 2012

(65) Prior Publication Data

US 2013/0271770 A1 Oct. 17, 2013

(51) Int. Cl.
*G01C 19/72* (2006.01)

(52) U.S. Cl.
USPC ........................................................ 356/461

(58) Field of Classification Search
USPC ................................................. 356/459–476
See application file for complete search history.

(56) References Cited

U.S. PATENT DOCUMENTS

| | | |
|---|---|---|
| 5,141,315 A | 8/1992 | Malvern |
| 5,296,912 A * | 3/1994 | Strandjord et al. ........... 356/461 |
| 6,201,638 B1 * | 3/2001 | Hall et al. ..................... 359/346 |
| 6,650,682 B1 | 11/2003 | Diels et al. |
| 7,123,800 B2 * | 10/2006 | Kaplan ............................ 385/50 |
| 7,372,574 B2 | 5/2008 | Sanders et al. |
| 2007/0292069 A1 * | 12/2007 | Kourogi et al. .................... 385/3 |
| 2010/0225923 A1 * | 9/2010 | Strandjord et al. ........... 356/461 |
| 2010/0245834 A1 * | 9/2010 | Strandjord ..................... 356/463 |
| 2011/0037985 A1 * | 2/2011 | Qiu et al. ........................ 356/461 |
| 2011/0181886 A1 * | 7/2011 | Strandjord et al. ........... 356/460 |
| 2011/0255094 A1 | 10/2011 | Mohageg et al. |

* cited by examiner

*Primary Examiner* — Kara E. Geisel
*Assistant Examiner* — Dominic J Bologna
(74) *Attorney, Agent, or Firm* — Fogg & Powers LLC

(57) ABSTRACT

A resonator fiber optic gyroscope comprises a first light source having a first frequency comb spectrum, and a second light source having a second frequency comb spectrum. A first filter is in optical communication with the first light source and configured to pass a first frequency comb portion. A second filter is in optical communication with the second light source and configured to pass a second frequency comb portion. A resonator is in optical communication with the first and second filters. The free spectral range values of the first and second frequency comb portions are adjusted to be an odd integer multiple of the free spectral range value of the resonances of the resonator. The second frequency comb portion is spectrally separated apart from the first frequency comb portion by a multiple of the free spectral range value of the resonances plus a frequency value proportional to rotation rate.

20 Claims, 3 Drawing Sheets

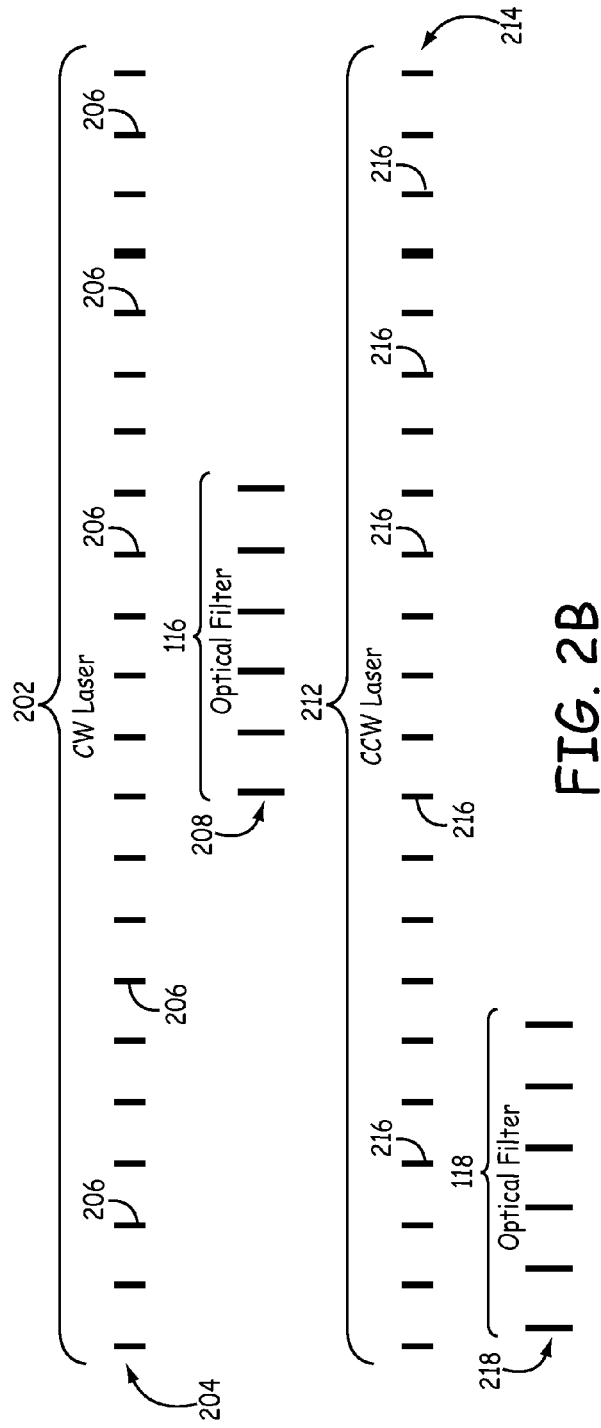

RESONATOR FIBER OPTIC GYROSCOPE UTILIZING LASER FREQUENCY COMBS

BACKGROUND

Gyroscopes are used to measure rotation rates or changes in angular velocity about an axis of rotation in many different applications. While a variety of high performance moderately-sized and more affordable gyroscopes for many defense and space applications have been developed, there is a need for still lower cost and/or smaller sized navigation grade gyroscopes for a range of military and commercial applications.

The resonator fiber optic gyroscope (RFOG) can combine strengths of ring laser gyroscopes and interferometric fiber gyroscopes to reach very high sensitivity in a smaller size and lower cost. The RFOG uses lasers to probe the resonances of a ring resonator in clockwise (CW) and counterclockwise (CCW) directions. In implementing a smaller and/or lower cost RFOG, one issue that needs to be addressed is that multiple (up to four) phase locked laser light sources may be needed to provide the light in the gyroscope, which may require a lot of power consumption and undesirably increase production cost. There is also a problem with getting very good bias stability in such a gyroscope.

SUMMARY

A resonator fiber optic gyroscope comprises a first light source configured to produce a first light beam having a first frequency comb spectrum, and a second light source configured to produce a second light beam having a second frequency comb spectrum. A first optical filter is in optical communication with the first light source and configured to pass a first frequency comb portion of the first frequency comb spectrum, with the first frequency comb portion having a free spectral range value. A second optical filter is in optical communication with the second light source and configured to pass a second frequency comb portion of the second frequency comb spectrum, with the second frequency comb portion having a free spectral range value. The second frequency comb portion is spectrally separated apart from the first frequency comb portion. An optical resonator is in optical communication with the first and second optical filters. The optical resonator has a plurality of resonances with a free spectral range value and comprises an optical fiber coil. The optical resonator is configured to circulate the first frequency comb portion of the first light beam through the optical fiber coil in a first counter-propagating direction, and circulate the second frequency comb portion through the optical fiber coil in a second counter-propagating direction. The free spectral range values of the first and second frequency comb portions are substantially the same and are adjusted to be an odd integer multiple of the free spectral range value of the resonances. The second frequency comb portion is spectrally separated apart from the first frequency comb portion by a multiple of the free spectral range value of the resonances plus a frequency value proportional to rotation rate.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A and 2B are schematic diagrams illustrating the frequency comb spectrum generated by the input lasers, and the filtered portions of the frequency comb spectrum, for the RFOG of FIG. 1.

Figure 1:
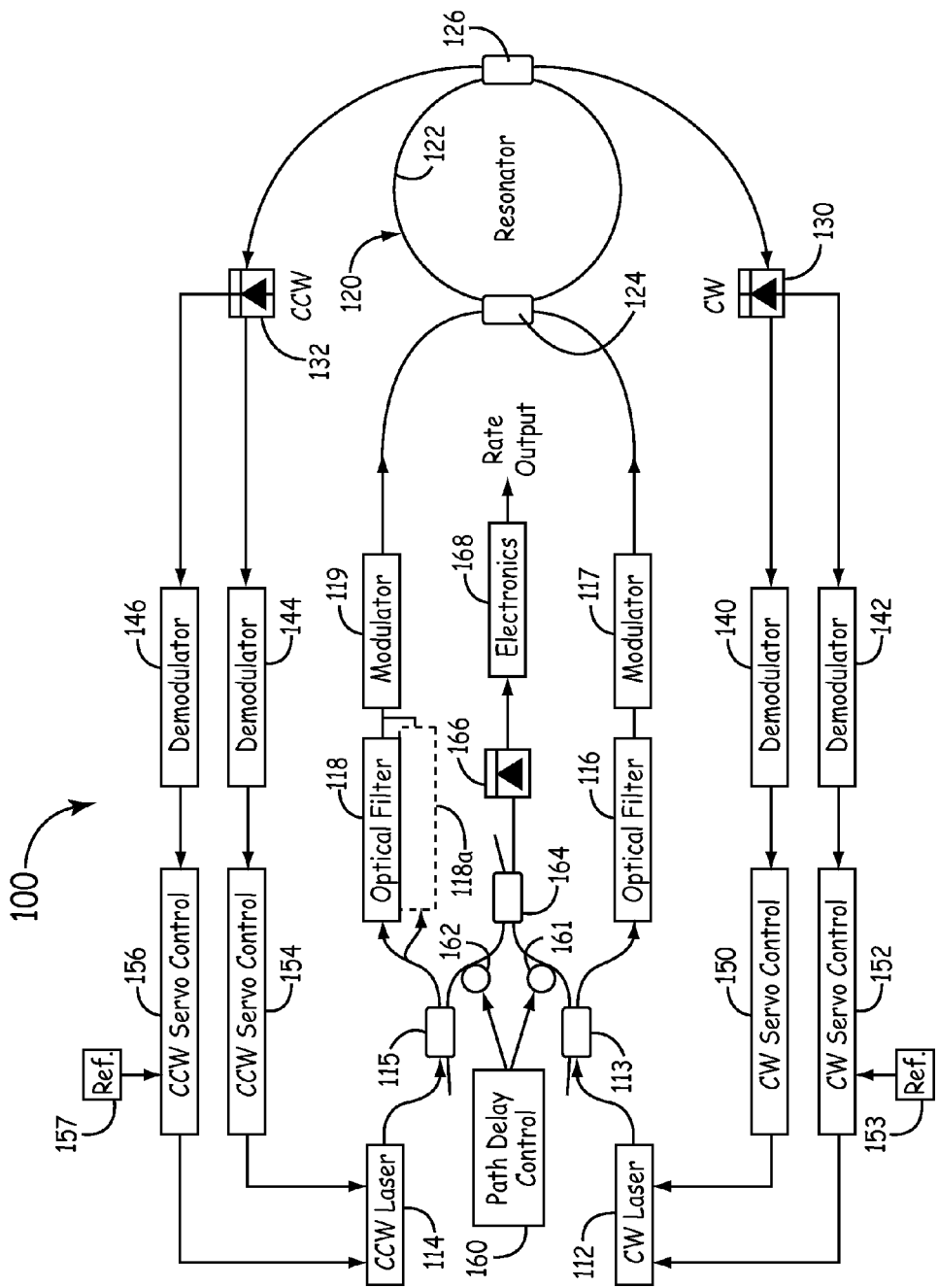
FIG. 1 is a block diagram of a resonator fiber optic gyroscope (RFOG) according to one embodiment.

In accordance with common practice, the various described features are not drawn to scale but are drawn to emphasize specific features relevant to the exemplary embodiments.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A resonator fiber optic gyroscope (RFOG) is provided that includes one or more light sources such as lasers that generate frequency comb spectrums. The present approach simplifies the optical system of the RFOG and provides improved gyroscope performance.

In an RFOG, counter-propagating light beams circulate through multiple turns of a fiber optic resonant coil and for multiple passes through the coil using an optical coupler, which redirects light that has passed through the coil back into the coil again (i.e., recirculates the light). The counter-propagating light beams are modulated and/or frequency shifted so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a given wavelength is referred to as "on resonance" when the round trip resonator path length is equal to an integral number of wavelengths. A rotation about the axis of the coil produces a different path length for clockwise and counterclockwise propagation. This produces a shift between the respective resonance frequencies of the resonator, and the frequency difference indicates the rotation rate.

The present approach employs frequency combs to generate multiple laser lines in CW and CCW directions for the RFOG. This can be done for the light source in each direction by using mode locked lasers. Mode locked lasers may be based on either active amplitude modulation or frequency modulation within the laser cavity, or may be based on passive mode locking. The latter may be accomplished by employing a saturable absorber within the laser cavity. For instance, fiber lasers may be mode locked by employing a semiconductor saturable absorber mirror as one end of the laser cavity. Semiconductor lasers may also be configured as mode locked lasers. In each case, the mode locked laser in the RFOG generates a series of laser lines with a fixed frequency difference, matched to an integral number of free spectral ranges in the CW and CCW direction. In order to prevent backscattering within the resonator for the same frequency or within a small frequency difference within the detection band of interest, the lasers are tuned such that their comb lines coincide on different longitudinal modes of the resonator.

The absolute frequencies of each laser comb are translated to follow the CW resonances and CCW resonances of the sensing resonator coil. Thus, in the presence of rotation, the absolute frequencies of the CW and CCW laser frequency combs will be shifted relative to each other, indicative of the resonance frequency difference due to rotation. The frequency difference between the comb lines in each direction is tuned to make sure the comb lines stay matched to the resonator resonances as the free spectral range changes with, for example, temperature. Thus, the spacing of the comb lines is the same in the CW and CCW directions since the free spectral range is the same; however, the comb lines are translated in frequency due to rotation rate.

In order to tell the difference between intensity changes and frequency changes (for rotation measurement) the combs are frequency modulated and the detected signals are demodulated. Because there are polarization and spatial mode errors in the fiber resonator that reverse direction every free spectral range, the comb spacing in each direction is an odd integer number of free spectral ranges of the fiber resonator.

Additional details of the present approach are described as follows with reference to the drawings.

FIG. 1 is a block diagram of an RFOG 100 according to an exemplary embodiment that utilizes frequency combs. The RFOG 100 includes a first light source 112 and a second light source 114, which generate light beams. In one embodiment, the first light sources 112, 114 are tunable mode-locked lasers that respectively generate clockwise (CW) counter-clockwise (CCW) light beams at multiple frequencies. The CW and CCW light beams have frequency comb spectrums with substantially the same free spectral ranges. The mode locked lasers can be implemented as fiber optic lasers, for example.

Mode-locking is a technique in which a laser can be made to produce pulses of light of extremely short duration. The basis of this technique is to induce a fixed phase relationship between numerous lasing modes of the laser's resonant cavity. The laser is then said to be phase-locked or mode-locked. Interference between these modes causes the laser light to be produced as a train of pulses. Depending on the properties of the laser, particularly how many modes are lasing, these pulses may be of extremely brief duration, as short as a few picoseconds or even shorter.

The mode-locked lasers produce a series of optical pulses separated in time by the round-trip time of a laser cavity. The spectrum of such a pulse train is a series of very narrow laser lines separated by the free spectral range of the laser cavity. The series of sharp spectral lines in the spectrum is called a frequency comb. The frequency spacing between adjacent spectral lines is the free spectral range (FSR).

A first optical filter 116 is in optical communication with first light source 112, and a second optical filter 118 is in optical communication with second light source 114. In one embodiment, optical filter 116 is optically connected to light source 112, such as a fiber optic laser, through an optical coupler 113. Likewise, optical filter 118 can be optically connected to light source 114, such as a fiber optic laser, through an optical coupler 115. An optional third optical filter 118a can be optically connected to light source 114 for symmetry or to address dispersion issues.

The optical filter 116 is configured to pass a first frequency comb portion of the light beam from light source 112. The optical filter 118 is configured to pass a second frequency comb portion of the light beam from light source 114 such that the second frequency comb portion is spectrally separated apart from the first frequency comb portion by a predetermined amount. When implemented, the optional optical filter 118a is configured to pass a third frequency comb portion of the light beam from light source 114 such that the third frequency comb portion is spectrally separated apart from both the first and second frequency comb portions. The optical filters can be implemented as Bragg gratings, one or more edge filters, or the like.

The first frequency comb portion is passed through a first modulator 117 to sinusoidally frequency-modulate the first frequency comb portion at a first frequency ($f_a$), used for detection of the sensing resonator's resonance frequencies. The second frequency comb portion (and third when used) is passed through a second modulator 119 to sinusoidally modulate the second frequency comb portion at a second frequency ($f_b$) that is different from the first frequency.

The operation of the mode-locked lasers in RFOG 100 is illustrated further in FIGS. 2A and 2B. The mode-locked lasers include a CW laser 202 and a CCW laser 212, which respectively generate a CW light beam and a CCW light beam. The CW light beam has a frequency comb spectrum 204 with a plurality of sharp spectral lines 206. The CCW light beam has a frequency comb spectrum 214 with a plurality of sharp spectral lines 216. As shown in FIG. 2A, frequency comb spectrums 204 and 206 have substantially the same free spectral range (FSR) between their respective spectral lines 206 and 216.

As depicted in FIG. 2B, optical filter 116 passes a frequency comb portion 208 of frequency comb spectrum 204 from CW laser 202. Likewise, optical filter 118 passes a frequency comb portion 218 of frequency comb spectrum 214 from CW laser 212. The optical filters 116 and 118 have different pass bands such that frequency comb portion 218 is spectrally separated apart from frequency comb portion 208 by a predetermined frequency amount.

Referring again to FIG. 1, an optical resonator 120 is in optical communication with optical filters 116 and 118. The optical resonator 120 comprises an optical fiber coil 122 that is configured to circulate the CW and CCW light beams in counter-propagating directions. The resonator 120 also includes a first recirculator 124 and a second recirculator 126 that are optically coupled to fiber coil 122. The recirculator 124 introduces the modulated light beams (e.g., CW and CCW input light beams) into optical fiber coil 122 and circulates a portion of the modulated light beams through optical fiber coil 122 in counter-propagating directions (e.g., CW and CCW directions).

A pair of photodetectors 130, 132 are optically coupled to resonator 120 by way of recirculator 126 and respectively sample the CW and CCW light beams circulating in resonator 120. A pair of demodulators 140, 142 are operatively coupled to photodetector 130 to demodulate the CW signal, and a pair of demodulators 144, 146 are operatively coupled to photodetector 132 to demodulate the CCW signal.

In one embodiment, demodulator 140 can be configured to demodulate a signal based on the first frequency ($f_a$), and demodulator 142 can be configured to demodulate a signal based on a second harmonic of the first frequency. In another embodiment, demodulator 142 can be replaced by an amplifier that accurately measures the DC intensity value on photodetector 130 originating from the CW laser and passing through the resonator. Likewise, demodulator 144 can be configured to demodulate a signal based on the second frequency ($f_b$), and demodulator 146 can be configured to demodulate a signal based on a second harmonic of the second frequency. In another embodiment, demodulator 146 can be replaced by an amplifier that accurately measures the DC intensity value on photodetector 132 originating from the CCW laser and passing through the resonator.

In the embodiment in which 142 and 146 are demodulators, the demodulated CW signals from demodulators 140, 142 are respectively transmitted to a pair of CW servo control units 150, 152 for further processing. Likewise, the demodulated CCW signals from demodulators 144, 146 are respectively transmitted to a pair of CCW servo control units 154, 156 for further processing. An output from each of servo control units 150 and 152 is coupled to light source 112, and an output from each of servo control units 154 and 156 is coupled to light source 114.

In one embodiment, CW servo control unit 150 is configured to process the demodulated signal from demodulator 140 to provide control of $v_{cw}$, which corresponds to the average frequency of the CW wave. The demodulated signal from demodulator 140 that is input into servo control unit 150 is driven to zero to by the electronics in servo control unit 150 such that the center CW comb lines are "on resonance" in the CW direction on average, that is, $v_{cw}$ is adjusted via the input to the CW laser. Assuming in this case that the free spectral range is not yet adjusted, the net output from demodulator 140 is zero, since the center line of the comb is on resonance and one side of the comb is off resonance in one direction, but the other side of the comb is off resonance in the opposite direction. This assumes the specific case of a symmetric comb, but even for an asymmetric comb the net output of demodulator 140 can be zeroed by averaging over the resonances when the free spectral range of the CW laser wave is not adjusted to the CW free spectral range of resonator 120. The servo control unit 152 is configured to process the signal from demodulator 142 to provide control of the free spectral range of the CW wave ($FSR_{cw}$). The demodulated signal from demodulator 142 is compared to a reference signal that is input into control unit 152 from a reference signal generator 153, and $FSR_{cw}$ is adjusted for input to the CW laser. In this way, the combination of signals from servo control units 150 and 152 adjust all the CW laser frequencies in the comb of the CW laser 112 to the corresponding center of the CW resonances of resonator 120. It should be noted that in the case of an asymmetric comb, the net output of demodulator 140 may be zeroed, but the center line of the asymmetric comb may be slightly off resonance from its corresponding resonator resonance line. This misalignment can be removed by using demodulator 142 and servo control unit 152.

Likewise, CCW servo control unit 154 can be configured to process the demodulated signal from demodulator 144 to provide control of $v_{ccw}$, which corresponds to the average frequency of the CCW wave. The demodulated signal from demodulator 144 that is input into servo control unit 154 is driven to zero to by the electronics in servo control unit 154 such that the center CCW comb lines are "on resonance" in the CCW direction on average, that is, $v_{ccw}$ is adjusted via the input to the CCW laser. Assuming in this case that the free spectral range is not yet adjusted, the net output from demodulator 144 is zero, since the center line of the comb is on resonance and one side of the comb is off resonance in one direction, but the other side of the comb is off resonance in the opposite direction. This assumes the specific case of a symmetric comb, but even for an asymmetric comb, the net output of demodulator 144 can be zeroed by averaging over the resonances when the free spectral range of the CCW laser wave is not adjusted to the CCW free spectral range of resonator 120. The servo control unit 156 is configured to process the signal from demodulator 146 to provide control of the free spectral range of the CCW wave ($FSR_{ccw}$). The demodulated signal from demodulator 146 is compared to a reference signal that is input into servo control unit 156 from a reference signal generator 157, and $FSR_{ccw}$ is adjusted for input to the CCW laser. In this way, the combination of signals from servo control units 154 and 156 adjust all the CCW laser frequencies in the comb of the CCW laser to the corresponding center of the CCW resonances of resonator 120.

The configuration of demodulator 140 and servo control unit 150 between photodetector 130 and light source 112 (CW laser) provides a first control loop for the CW laser, and the parallel configuration of demodulator 142 and servo control unit 152 provides a second control loop for the CW laser. In a similar fashion, the configuration of demodulator 144 and servo control unit 154 between photodetector 132 and light source 114 (CCW laser) provides a first control loop for the CCW laser, and the parallel configuration of demodulator 146 and servo control unit 156 provides a second control loop for the CCW laser. The parallel control loops for the CW laser and the CCW laser provide the necessary adjustment of all the CW and CCW laser frequencies in each comb to the corresponding center of the CW resonances and CCW resonances of resonator 120, respectively. This maximizes signal-to-noise ratio for rotation rate and minimizes bias offsets that are a false indication of rotation rate.

Figure 3:
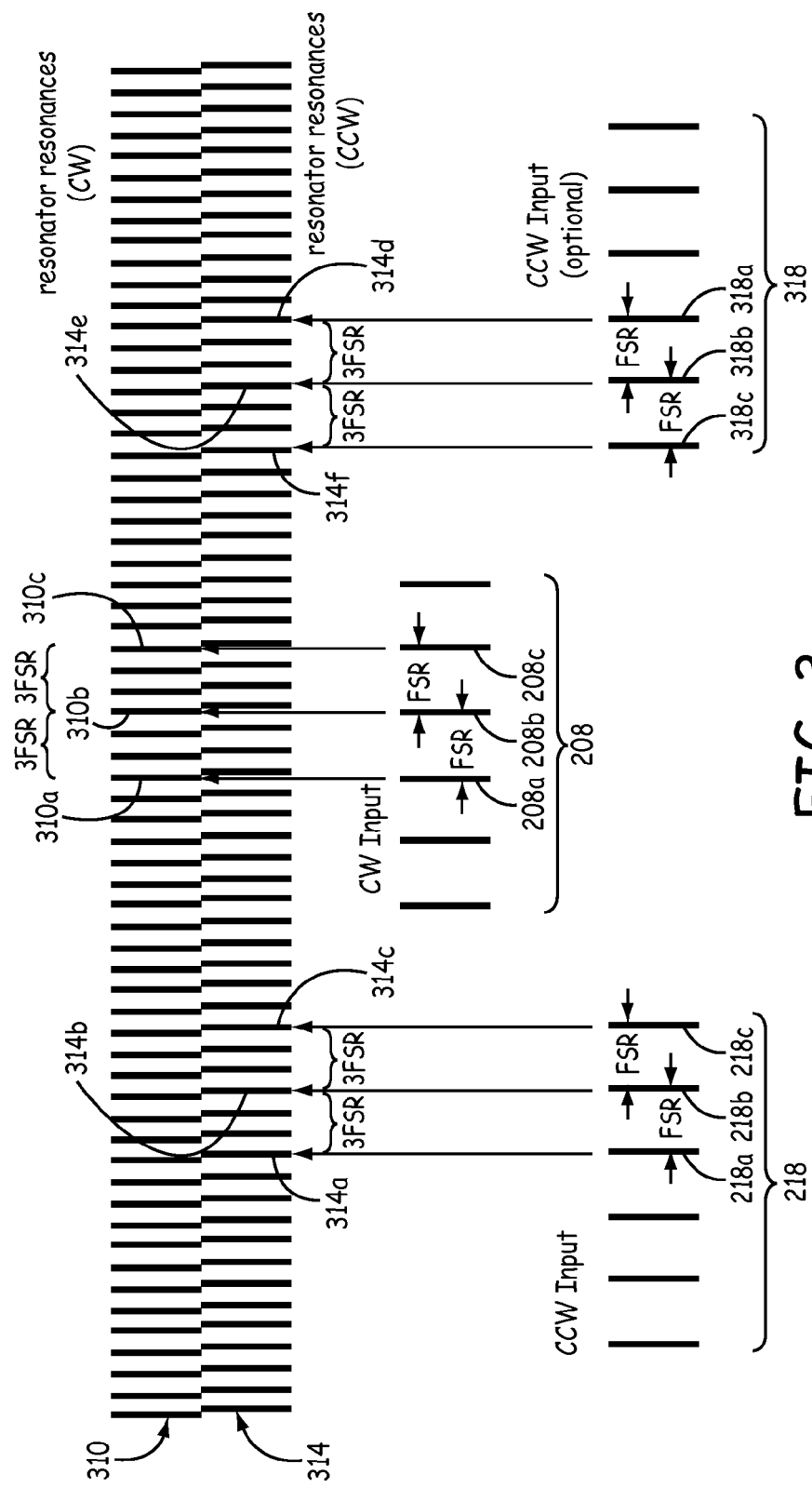
FIG. 3 is a schematic diagram illustrating the filtered portions of the frequency comb spectrum generated by the input lasers, and the sensing resonator resonances, for the RFOG of FIG. 1.

FIG. 3 illustrates the sensing resonator resonances (longitudinal modes) of the optical resonator for both the CW input and CCW input according to an exemplary embodiment. The sensing resonator resonances are represented by a plurality of resonance lines 310 for the CW input and plurality of resonance lines 314 for the CCW input, which are offset from resonance lines 310 as shown in FIG. 3. The resonance lines 310 and 314 are shifted with respect to each other based on rotation rate of the gyroscope.

In the present approach, the mode-locked lasers are tuned such that the spectral lines of the frequency comb spectrum generated by each of the CW laser and CCW laser coincide with different longitudinal modes of the optical resonator. As such, the lasers are tuned so that the comb spectral lines are spaced at an odd integer multiple of the resonator FSR to cancel bias error terms that are known to change polarity every other longitudinal mode of the resonator.

For example, during tuning of the CW laser of RFOG 100, a CW wave of frequency comb portion 208 from optical filter 116 (FIG. 2) is frequency modulated at frequency $f_a$. The center frequency of the CW wave is then locked to the CW resonances of the resonator via a phase sensitive detector, i.e., demodulator 140. This process is carried out by demodulating the signal from photodetector 130 at frequency $f_a$ and producing a discriminant or error signal for servo control unit 150. The discriminant is a signal that has a large magnitude of one sign when the average frequency of the comb is off-center from the resonance in one direction and has a large magnitude of the opposite sign when the average frequency of the comb is off-center from the resonance in the other direction. The discriminant is zero when the center of the comb is lined up with the center of a resonator resonance. The servo control unit 150 adjusts the output of demodulator 140, and the discriminant to zero. The CW laser is then adjusted so that the output of photodetector 130 at $f_a$ is generally zero. The adjustment process is performed by servo control unit 150 so that the center frequency of the frequency comb portion on average is aligned with the resonance lines in the CW direction.

A second harmonic of frequency $f_a$ ($2f_a$) can be determined by demodulating the signal from photodetector 130 in demodulator 142. Alternatively, a DC intensity component can be determined by detecting a DC value from photodetector 130 when an amplifier is employed in place of demodulator 142. The DC intensity component or second harmonic is brought to a predetermined level to make sure the spacing between the spectral lines of frequency comb portion 208 is correct, so that the spectral lines are aligned with the resonator resonances to maximize the signal. This is shown in FIG. 3, where spectral lines 208a, 208b, and 208c of frequency comb portion 208 are respectively aligned with resonance lines 310a, 310b, and 310c. Such an alignment process is performed by servo control unit 152 in combination with servo control unit 150 of RFOG 100. The servo control unit 152 compares the demodulated signal to a reference value and adjusts the DC or second harmonic to the correct value for input to the CW laser.

In a similar fashion, during tuning of the CCW laser of RFOG 100, a CCW wave from frequency comb portion 218 is frequency modulated at a frequency $f_b$. The center frequency of the CCW wave is then locked to the CCW resonances of the resonator via a phase sensitive detector, i.e., demodulator 144. This process is carried out by demodulating the signal from photodetector 132 at frequency $f_b$ and producing a discriminant or error signal for servo control unit 154. The servo control unit 154 adjusts the output of demodulator 144, and the discriminant to zero. The CCW laser is then adjusted so that the output of photodetector 132 at $f_a$ is generally zero. The adjustment process is performed by servo control unit 154 so that the center frequency of the frequency comb portion on average is aligned with the resonance lines in the CCW direction.

A second harmonic of frequency fb (2fb) can be determined by demodulating the signal from photodetector 132 in demodulator 146. Alternatively, a DC intensity component can be determined by detecting a DC value from photodetector 132 when an amplifier is employed in place of demodulator 146. The DC intensity component or second harmonic is brought to a predetermined level to make sure the spacing between the spectral lines of frequency comb portion 218 is correct, so that the spectral lines are aligned with the resonator resonances to maximize the signal. This is shown in FIG. 3, where spectral lines 218a, 218b, and 218c of frequency comb portion 218 are respectively aligned with resonance lines 314a, 314b, and 314c. Such an alignment process is performed by servo control unit 156 in combination with servo control unit 154. The servo control unit 156 compares the demodulated signal at fb to a reference value and adjusts the DC or second harmonic to the correct value for input to the CCW laser.

The foregoing alignment process can also be performed for an optional third frequency comb portion 318, when optical filter 118a is employed in RFOG 100 for the CCW laser. During tuning of the CCW laser, CCW waves from frequency comb portion 318 and frequency comb portion 218 are frequency modulated at the frequency $f_b$. The center frequency of the CCW waves from frequency comb portions 218 and 318 is then locked to the CCW resonances by demodulating the signal from photodetector 132 at frequency $f_b$ and producing a discriminant or error signal for servo control unit 154. The servo control unit 154 adjusts the output of demodulator 144, and the discriminant to zero. The CCW laser is then adjusted so that the output of photodetector 132 at $f_b$ is generally zero. The adjustment process is performed by servo control unit 154 so that the center frequency of frequency comb portions 218 and 318 on average are aligned with the resonance lines in the CCW direction.

A second harmonic of frequency $f_b$ ($2f_b$) can be determined by demodulating the signal from photodetector 132 in demodulator 146. Alternatively, a DC intensity component can be determined by detecting a DC value from photodetector 132 when an amplifier is employed in place of demodulator 146. The DC intensity component or second harmonic is brought to a predetermined level to make sure the spacing between the spectral lines of frequency comb portions 218 and 318 is correct. This is shown in FIG. 3, where spectral lines 318a, 318b, and 318c of frequency comb portion 318 are respectively aligned with resonance lines 314d, 314e, and 314f. This is also shown in FIG. 3 for frequency comb portion 218, where spectral lines 218a, 218b, and 218c are respectively aligned with resonance lines 314a, 314b, and 314c. Such an alignment process is performed by servo control unit 156 in combination with servo control unit 154. The servo control unit 156 compares the demodulated signal at $f_b$ to a reference value and adjusts the DC or second harmonic to the correct value for input to the CCW laser.

The spacing between of the spectral lines of the frequency comb portions can be adjusted to be at an odd integer multiple (e.g., 3, 5, 7, 9, . . . ) of the FSR of the resonator resonances. For example, in the embodiment shown in FIG. 3, the spectral lines 208a, 208b, and 208c of frequency comb portion 208 are centered at the corresponding resonance lines 310a, 310b, and 310c such that the FSR of frequency comb portion 208 is 3FSR of the resonator resonances. Likewise, the spectral lines 218a, 218b, and 218c of frequency comb portion 218 are centered at the corresponding resonance lines 314a, 314b, and 314c such that the FSR of frequency comb portion 218 is 3FSR of the resonator resonances. When frequency comb portion 318 is used, the spectral lines 318a, 318b, and 318c are centered at the corresponding resonance lines 314d, 314e, and 314f such that the FSR of frequency comb portion 318 is 3FSR of the resonator resonances.

In one exemplary embodiment, if the spacing between the resonance modes (i.e., FSR) of the resonator is 10 MHz, then the FSR of the frequency comb portions 208, 218, and 318 would be 30 MHz.

As shown in FIG. 3, frequency comb portions 218 and 318 are spectrally separated apart on either side of from frequency comb portion 208 to provide symmetry. This symmetry is advantageous since, in practice there may be properties of the optical fiber 122, the recirculators 124 and 126 and/or optical components between the lasers and the optical fiber whose properties change with optical frequency. For instance, if the optical phase modulator loss or efficiency were to change linearly with frequency, the same average loss and efficiency for CW and CCW input waves would be achieved, since the mean frequency of spectrum 208 and the mean frequencies of spectra 218 and 318 (combined) are substantially equal. The frequency comb portions 218 and 318 can be spectrally separated apart from frequency comb portion 208 by a multiple of the FSR of the resonator resonances.

In other embodiments, the FSR of the frequency comb portions of the CW and CCW lasers can be other odd integer multiples of the FSR of the resonator, such as 5FSR, 7 FSR, etc., depending on the application for the gyroscope. By using odd integer multiples of resonator FSR, errors in the gyroscope are canceled out.

While the embodiment of FIG. 3 depicts the frequency comb portions with six (6) spectral lines, other embodiments can utilize frequency comb portions with greater numbers of spectral lines. For example, if the frequency comb portions each have 100 spectral lines, each of the frequency comb portions have a bandwidth of about 3 GHz and are spectrally separated apart by about 1 GHz. In addition, the center frequency of each of frequency comb portions are separated by 4 GHz.

The width of individual spectral lines in the frequency comb portions depends on the grade of gyroscope that is desired. For example, in navigation grade gyroscopes used to guide commercial or military aircraft, the individual spectral lines may need to have an instantaneous width of less than about 10 kHz depending on the exact spectrum of frequency noise of the laser.

Since the FSR depends on the optical path length, which can depend on temperature due to thermal expansion, the resulting rotation output may be less accurate due to temperature variations without the operation of servo control units 152 and 156, which are designed to adjust the laser free spectral ranges. For example, the servo controls may tune the laser free spectral ranges by changing the temperature of each laser, thereby adjusting the laser cavity length. In this way, inaccuracies from drift in the FSR of resonator 120 will be substantially attenuated or eliminated.

Referring again to FIG. 1, optical couplers 113 and 115 also respectively connect light sources 112 and 114 to a path delay control section 160 of RFOG 100, such that portions of the prefiltered CW and CCW light beams are directed to path delay control section 160. The CW and CCW light beams are then combined at an optical coupler 164 and sent to a photodetector 166 to determine a beat frequency (e.g., $v_{ccw} - v_{cw}$).

The path delay control section 160 can be implemented with active or passive controls so that pulses from the CW and CCW lasers arrive at the same time at photodetector 166. For example, as shown in FIG. 1, passive optical fiber loops 161 and 162 can be employed, which are constructed with different lengths allow the pulses to arrive at the same time at photodetector 166. Alternatively, an active control can be utilized by heating or stretching optical fiber loops 161 and 162. For example, the optical fiber loops can be wrapped around a piezoelectric cylinder or attached to a heater (or both), to expand or contract the path length of the optical fiber loops as required.

An electrical signal from photodetector 166 is processed by an electronics module 168 to determine the rate output. The frequency difference between the CW beam and the CCW beam is the primary measurement output of the RFOG 100. The beat frequency ($v_{ccw} - v_{cw}$) is proportional to the rotation rate of the gyroscope.

By application of the Sagnac Effect, the RFOG 100 senses a rotation rate about an axis thereof. The photodetectors 130, 132 convert optical signals representing the circulating CW and CCW light beams to electrical signals, which are sent to demodulators 144, 146 and demodulators 140, 142. The signals from the photodetectors have a sinusoidal component indicating the frequency deviation between the laser frequency and the resonance frequencies of resonator 120. This sinusoidal component is demodulated to provide error signals. The CW servo control units 150, 152 and CCW servo control units 154, 156 detect the resonance centers of the resonance line shapes for the CW and CCW circulating light beams based on the demodulated signals, and place the CW and CCW light wave inputs on the resonance frequencies associated with each of the counter-propagating directions of the resonator 120 based on the frequency shift between the detected signals at the photodetectors, indicative of the frequencies of the resonance centers. The frequency shift is used to determine the rotation rate of RFOG 100.

The resonator fiber optic gyroscope disclosed herein is suited to a variety of applications including, by way of example, applications requiring inertial guidance such as aircraft, land vehicles, submarines, satellites, surface ship navigation, and the like. In addition, the present resonator fiber optic gyroscope can be implemented on very small platforms including, by way of example, small robots, individual soldier footwear, small-scale satellites, and the like.

EXAMPLE EMBODIMENTS

Example 1 includes a resonator fiber optic gyroscope, comprising a first light source configured to produce a first light beam having a first frequency comb spectrum; a second light source configured to produce a second light beam having a second frequency comb spectrum; a first optical filter in optical communication with the first light source and configured to pass a first frequency comb portion of the first frequency comb spectrum, the first frequency comb portion having a free spectral range value; a second optical filter in optical communication with the second light source and configured to pass a second frequency comb portion of the second frequency comb spectrum, the second frequency comb portion having a free spectral range value, wherein the second frequency comb portion is spectrally separated apart from the first frequency comb portion; and an optical resonator in optical communication with the first and second optical filters, the optical resonator having a plurality of resonances with a free spectral range value, the optical resonator comprising an optical fiber coil and configured to circulate the first frequency comb portion of the first light beam through the optical fiber coil in a first counter-propagating direction; and circulate the second frequency comb portion through the optical fiber coil in a second counter-propagating direction; wherein the free spectral range values of the first and second frequency comb portions are substantially the same and are adjusted to be an odd integer multiple of the free spectral range value of the resonances; wherein the second frequency comb portion is spectrally separated apart from the first frequency comb portion by a multiple of the free spectral range value of the resonances plus a frequency value proportional to rotation rate.

Example 2 includes the gyroscope of Example 1, wherein the first and second light sources each comprise a tunable mode-locked laser.

Example 3 includes the gyroscope of Example 2, wherein the tunable mode-locked lasers comprise fiber optic lasers.

Example 4 includes the gyroscope of any of Examples 1-3, wherein the first light source generates a clockwise (CW) light beam, and the second light source generates a counter-clockwise (CCW) light beam.

Example 5 includes the gyroscope of any of Examples 1-4, wherein the first and second frequency comb spectrums have substantially the same free spectral range.

Example 6 includes the gyroscope of any of Examples 1-5, further comprising a third optical filter in optical communication with the second light source and configured to pass a third frequency comb portion, wherein the third frequency comb portion is spectrally separated apart from the first frequency comb portion by a multiple of the free spectral range value of the resonances plus a frequency value proportional to rotation rate, and wherein the third frequency comb portion is spectrally separated apart from the second frequency comb portion by a multiple of the free spectral range value of the resonances.

Example 7 includes the gyroscope of any of Examples 1-6, wherein the first frequency comb portion is modulated at a first frequency, and the second frequency comb portion is modulated at a second frequency that is different from the first frequency.

Example 8 includes the gyroscope of any of Examples 1-7, further comprising a first photodetector optically coupled to the optical resonator and configured to sample the CW light beam circulating in the optical resonator; and a second photodetector optically coupled to the optical resonator and configured to sample the CCW light beam circulating in the optical resonator.

Example 9 includes the gyroscope of Example 8, further comprising a first demodulator operatively coupled to the first photodetector and configured to demodulate a signal based on the first frequency; and a second demodulator or an amplifier operatively coupled to the first photodetector; wherein the second demodulator is configured to demodulate a signal based on a second harmonic of the first frequency; wherein the amplifier is configured to determine a DC intensity value.

Example 10 includes the gyroscope of Example 9, further comprising a third demodulator operatively coupled to the second photodetector and configured to demodulate a signal based on the second frequency; and a fourth demodulator or an amplifier operatively coupled to the second photodetector; wherein the fourth demodulator is configured to demodulate a signal based on a second harmonic of the first frequency; wherein the amplifier is configured to determine a DC intensity value.

Example 11 includes the gyroscope of any of Examples 9-10, further comprising a first servo control unit operatively coupled to the first demodulator and configured to process the demodulated signal from the first demodulator; and a second servo control unit operatively coupled to the second demodulator or the amplifier and configured to process the demodulated signal from the second demodulator or the DC intensity value from the amplifier; wherein an output from each of the first and second servo control units provides a control signal to the first light source.

Example 12 includes the gyroscope of any of Examples 10-11, further comprising a third servo control unit operatively coupled to the third demodulator and configured to process the demodulated signal from the third demodulator; and a fourth servo control unit operatively coupled to the fourth demodulator or the amplifier and configured to process the demodulated signal from the fourth demodulator or the DC intensity value from the amplifier; wherein an output from each of the third and fourth servo control units provides a control signal to the second light source.

Example 13 includes the gyroscope of any of Examples 1-12, further comprising a path delay control section optically coupled to the first and second light sources.

Example 14 includes the gyroscope of any of Examples 8-13/ , further comprising a third photodetector optically coupled to the path delay control section.

Example 15 includes the gyroscope of any of Examples 8-14, further comprising an electronics module operatively coupled to the third photodetector and configured to process an electrical signal from the third photodetector to determine a rate output.

Example 16 includes a method for determining a rotation rate of a resonator fiber optic gyroscope, the method comprising generating a first light beam having a first frequency comb spectrum; generating a second light beam having a second frequency comb spectrum, the first and second frequency comb spectrums each have substantially the same free spectral range; filtering the first light beam to pass a first frequency comb portion of the first frequency comb spectrum to an optical resonator in the gyroscope; filtering the second light beam to pass a second frequency comb portion of the first frequency comb spectrum to the optical resonator, the second frequency comb portion spectrally separated apart from the first frequency comb portion; locking the first frequency comb portion to clockwise resonances of the optical resonator, the clockwise resonances each having the same free spectral range value; locking the second frequency comb portion to counter-clockwise resonances of the optical resonator that are different from the clockwise resonances, the counter-clockwise resonances each having the same free spectral range value; adjusting a free spectral range value of the first frequency comb portion to be an odd integer multiple of the free spectral range value of the clockwise resonances; adjusting a free spectral range value of the second frequency comb portion to be an odd integer multiple of the free spectral range value of the counter-clockwise resonances; and determining a frequency difference between the first and second input light beams, the frequency difference proportional to a rotation rate of the gyroscope.

Example 17 includes the method of Example 16, wherein the free spectral range values of the first and second frequency comb portions are substantially the same.

Example 18 includes the method of any of Examples 16-17, wherein the second frequency comb portion is spectrally separated apart from the first frequency comb portion by a multiple of the free spectral range value of the clockwise and counter-clockwise resonances plus a frequency difference component that is proportional to rotation rate.

Example 19 includes the method of any of Examples 16-18, further comprising locking a third frequency comb portion to the counter-clockwise resonances, wherein the third frequency comb portion is spectrally separated apart from the second frequency comb portion by a multiple of the free spectral range value of the clockwise and counter-clockwise resonances, and wherein the third frequency comb portion is spectrally separated apart from the first frequency comb portion by a multiple of the free spectral range value of the clockwise and counter-clockwise resonances plus a frequency difference component that is proportional to rotation rate.

Example 20 includes the method of any of Examples 16-19, wherein the first frequency comb portion is modulated at a first frequency, and the second frequency comb portion is modulated at a second frequency that is different from the first frequency.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonator fiber optic gyroscope, comprising:
   a first light source configured to produce a first light beam having a first frequency comb spectrum;
   a second light source configured to produce a second light beam having a second frequency comb spectrum;
   a first optical filter in optical communication with the first light source and configured to pass a first frequency comb portion of the first frequency comb spectrum, the first frequency comb portion having a free spectral range value;
   a second optical filter in optical communication with the second light source and configured to pass a second frequency comb portion of the second frequency comb spectrum, the second frequency comb portion having a free spectral range value, wherein the second frequency comb portion is spectrally separated apart from the first frequency comb portion; and
   an optical resonator in optical communication with the first and second optical filters, the optical resonator having a plurality of resonances with a free spectral range value, the optical resonator comprising an optical fiber coil and configured to:
   circulate the first frequency comb portion of the first light beam through the optical fiber coil in a first counter-propagating direction; and circulate the second frequency comb portion through the optical fiber coil in a second counter-propagating direction;

wherein the free spectral range values of the first and second frequency comb portions are substantially the same and are adjusted to be an odd integer multiple of the free spectral range value of the resonances;

wherein the second frequency comb portion is spectrally separated apart from the first frequency comb portion by a multiple of the free spectral range value of the resonances plus a frequency value proportional to rotation rate.

2. The gyroscope of claim 1, wherein the first and second light sources each comprise a tunable mode-locked laser.

3. The gyroscope of claim 1, wherein the tunable mode-locked lasers comprise fiber optic lasers.

4. The gyroscope of claim 1, wherein the first light source generates a clockwise (CW) light beam, and the second light source generates a counter-clockwise (CCW) light beam.

5. The gyroscope of claim 1, wherein the first and second frequency comb spectrums have substantially the same free spectral range.

6. The gyroscope of claim 1, further comprising a third optical filter in optical communication with the second light source and configured to pass a third frequency comb portion, wherein the third frequency comb portion is spectrally separated apart from the first frequency comb portion by a multiple of the free spectral range value of the resonances plus a frequency value proportional to rotation rate, and wherein the third frequency comb portion is spectrally separated apart from the second frequency comb portion by a multiple of the free spectral range value of the resonances.

7. The gyroscope of claim 4, wherein the first frequency comb portion is modulated at a first frequency, and the second frequency comb portion is modulated at a second frequency that is different from the first frequency.

8. The gyroscope of claim 7, further comprising:
a first photodetector optically coupled to the optical resonator and configured to sample the CW light beam circulating in the optical resonator; and
a second photodetector optically coupled to the optical resonator and configured to sample the CCW light beam circulating in the optical resonator.

9. The gyroscope of claim 8, further comprising:
a first demodulator operatively coupled to the first photodetector and configured to demodulate a signal based on the first frequency; and
a second demodulator or an amplifier operatively coupled to the first photodetector;
wherein the second demodulator is configured to demodulate a signal based on a second harmonic of the first frequency;
wherein the amplifier is configured to determine a DC intensity value.

10. The gyroscope of claim 9, further comprising:
a third demodulator operatively coupled to the second photodetector and configured to demodulate a signal based on the second frequency; and
a fourth demodulator or an amplifier operatively coupled to the second photodetector;
wherein the fourth demodulator is configured to demodulate a signal based on a second harmonic of the first frequency;
wherein the amplifier is configured to determine a DC intensity value.

11. The gyroscope of claim 9, further comprising:
a first servo control unit operatively coupled to the first demodulator and configured to process the demodulated signal from the first demodulator; and
a second servo control unit operatively coupled to the second demodulator or the amplifier and configured to process the demodulated signal from the second demodulator or the DC intensity value from the amplifier;
wherein an output from each of the first and second servo control units provides a control signal to the first light source.

12. The gyroscope of claim 10, further comprising:
a third servo control unit operatively coupled to the third demodulator and configured to process the demodulated signal from the third demodulator; and
a fourth servo control unit operatively coupled to the fourth demodulator or the amplifier and configured to process the demodulated signal from the fourth demodulator or the DC intensity value from the amplifier;
wherein an output from each of the third and fourth servo control units provides a control signal to the second light source.

13. The gyroscope of claim 1, further comprising a path delay control section optically coupled to the first and second light sources.

14. The gyroscope of claim 13, further comprising a third photodetector optically coupled to the path delay control section.

15. The gyroscope of claim 14, further comprising an electronics module operatively coupled to the third photodetector and configured to process an electrical signal from the third photodetector to determine a rate output.

16. A method for determining a rotation rate of a resonator fiber optic gyroscope, the method comprising:
generating a first light beam having a first frequency comb spectrum;
generating a second light beam having a second frequency comb spectrum, the first and second frequency comb spectrums each have substantially the same free spectral range;
filtering the first light beam to pass a first frequency comb portion of the first frequency comb spectrum to an optical resonator in the gyroscope;
filtering the second light beam to pass a second frequency comb portion of the first frequency comb spectrum to the optical resonator, the second frequency comb portion spectrally separated apart from the first frequency comb portion;
locking the first frequency comb portion to clockwise resonances of the optical resonator, the clockwise resonances each having the same free spectral range value;
locking the second frequency comb portion to counter-clockwise resonances of the optical resonator that are different from the clockwise resonances, the counter-clockwise resonances each having the same free spectral range value;
adjusting a free spectral range value of the first frequency comb portion to be an odd integer multiple of the free spectral range value of the clockwise resonances;
adjusting a free spectral range value of the second frequency comb portion to be an odd integer multiple of the free spectral range value of the counter-clockwise resonances; and
determining a frequency difference between the first and second input light beams, the frequency difference proportional to a rotation rate of the gyroscope.

17. The method of claim 16, wherein the free spectral range values of the first and second frequency comb portions are substantially the same.

18. The method of claim 16, wherein the second frequency comb portion is spectrally separated apart from the first frequency comb portion by a multiple of the free spectral range value of the clockwise and counter-clockwise resonances plus a frequency difference component that is proportional to rotation rate.

19. The method of claim 16, further comprising locking a third frequency comb portion to the counter-clockwise resonances, wherein the third frequency comb portion is spectrally separated apart from the second frequency comb portion by a multiple of the free spectral range value of the clockwise and counter-clockwise resonances, and wherein the third frequency comb portion is spectrally separated apart from the first frequency comb portion by a multiple of the free spectral range value of the clockwise and counter-clockwise resonances plus a frequency difference component that is proportional to rotation rate.

20. The method of claim 16, wherein the first frequency comb portion is modulated at a first frequency, and the second frequency comb portion is modulated at a second frequency that is different from the first frequency.

\* \* \* \* \*